Sept. 26, 1933. F. R. STEPHENS 1,928,116
CYLINDER HEAD GASKET FOR INTERNAL COMBUSTION ENGINES
Filed April 2, 1932
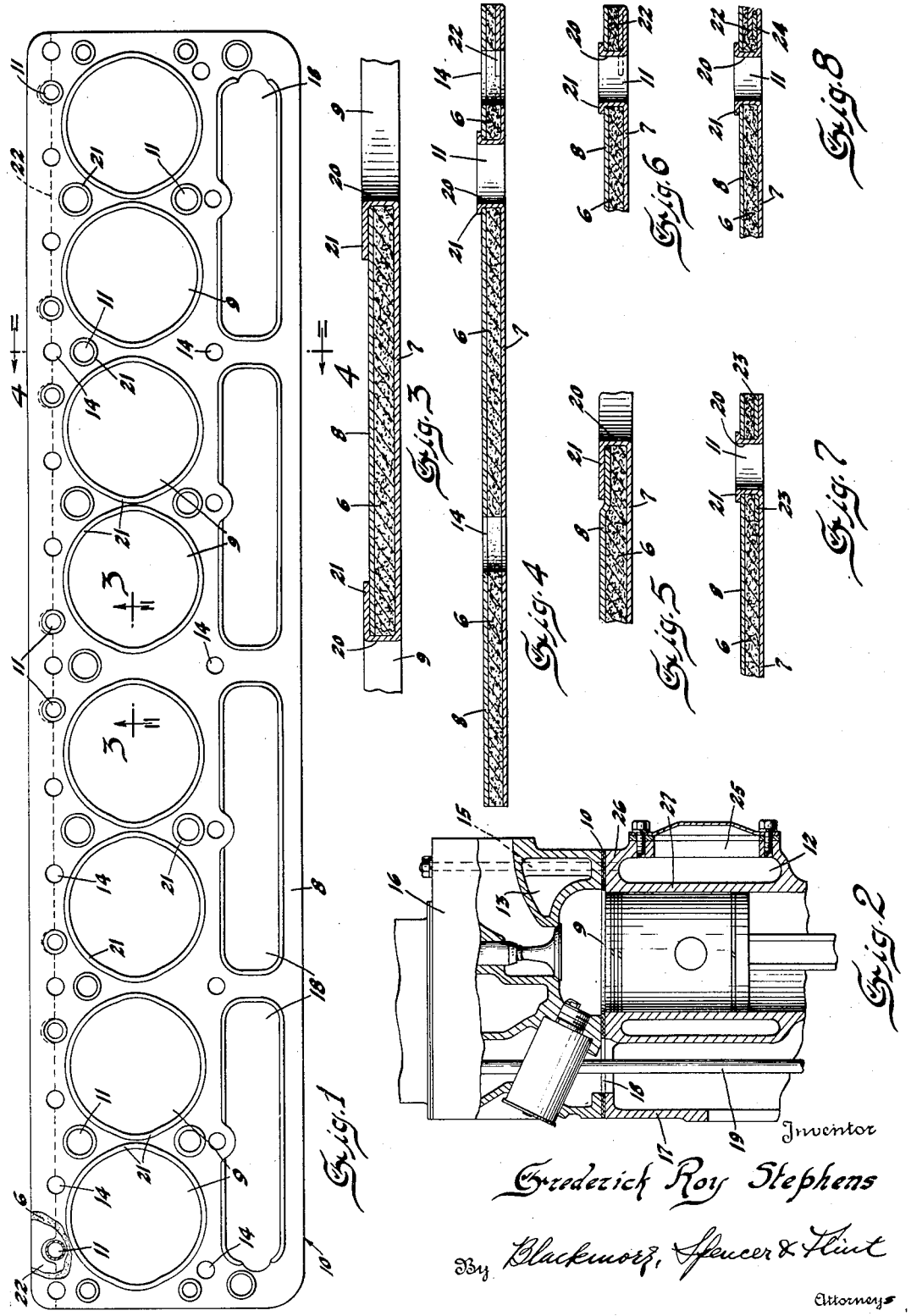

Patented Sept. 26, 1933

1,928,116

UNITED STATES PATENT OFFICE 1,928,116

CYLINDER HEAD GASKET FOR INTERNAL COMBUSTION ENGINES

Frederick Roy Stephens, Oshawa, Ontario, Canada, assignor to General Motors Corporation, Detroit, Mich., a corporation of Delaware Application April 2, 1932. Serial No. 602,690

2 Claims. (Cl. 288—1)

My invention relates to gaskets of large area such as are placed between the upper end of multiple cylinder engine cylinder blocks and the under surface of the cylinder head casting, which is common to all the cylinders; the gaskets to which I refer being of the type wherein a sheet of asbestos or equivalent yieldable material is assembled between sheets of thin sheet copper or similar metal to form a unitary gasket structure. Although not limited as regards use to engines having any particular number of cylinders six cylinder engines, and eight cylinder engines with the cylinders in line, such as are used in present day automobiles, are mentioned as engines for use with which my improved gasket is especially designed; and the object of my invention is to provide a gasket of such construction that the cylinder walls will not be distorted by the tightening of the bolts whereby the head is secured to the block, with the gasket between adjacent surfaces of the two parts.

There is as a matter of course no particular difficulty in forming perfectly plane surfaces upon the under side of the head casting and the upper end of the cylinder block, both of which are of large area, of engines such as I have mentioned; and if the head could be secured to the block without an intervening gasket there would be no distortion of the cylinder walls. In practice, however, a gasket is necessary in order to prevent leakage of the cooling water into the cylinders, and for other purposes; and I have found that when gaskets heretofore in use are used distortion of the cylinder walls occurs when the bolts which secure the head casting to the cylinder block, with the gasket between them, are properly tightened. Such distortion tends to produce binding of the pistons in their cylinders and, if the pistons are fitted loose enough to avoid binding, then they are apt to be noisy and the engine to have objectionable "piston knock", as the noise is commonly called.

The reason why distortion is produced as the holding bolts are tightened and the parts adapt themselves to one another is that different parts of the gasket are compressed to different degrees during such tightening, with the result that the thickness of the gasket of the form in use at the present time varies at different points in the area thereof. Thus along the periphery where the yieldable asbestos or like material layer is comparatively free to expand tightening of the bolts will produce the greatest reduction in thickness of the gasket, while further in toward the middle parts where the yieldable material is more constrained its thickness is not reduced so much by the tightening operation. Furthermore, the holes in such gaskets above the cylinders, and the holes whereby the cooling water passes from the cylinder block jacket space to the cooling space in the head casting, ordinarily have metallic linings (as will hereinafter appear) which add one or more thicknesses of metal to the gasket at points removed from the periphery thereof, thus further resisting reduction in thickness of the gasket at certain definite places as the bolts are tightened. Even were it possible to subject every holding bolt to precisely the same tension the thickness of the gasket would vary appreciably throughout the areas of contact between the engine parts and the two surfaces thereof; and in actual practice wherein the tension to which the holding bolts are subjected cannot be definitely determined, and in fact varies throughout a considerable range, the thickness to which the gasket is reduced during the securing of the head in place has been found to vary to a considerable extent throughout its area. The material of both the head casting and the cylinder block is elastic and yields as the bolts are tightened and the surfaces of the block and head accommodate themselves to variations in thickness of the gasket; but the structure of the block is such that it yields more than the comparatively rigid head; from which it follows that the block rather than the head is distorted during the tightening of the holding bolts, which distortion results in distortion of the cylinder walls as above explained.

The distortion herein mentioned is due to structural features of the cylinder block and of the head casting, to features inherent in such gaskets as have been available and in use prior to my invention, and to the tension to which each individual fastening bolt is subjected during the securing of the head to the block. That is it is not due to temperature of the block or head. The temperatures attained by the engine when in operation no doubt produces a certain amount of redistribution of stresses due to the tightening of the holding bolts, and of the distortion which follows the securing of the head in place; but in the development of my invention I have found that the distortion referred to is produced even in a cold engine when gaskets such as have been heretofore obtainable are used, whereas on the contrary when a gasket in accordance with my invention is used there is no appreciable distortion when the engine is cold, and no piston knock when the engine is in operation and is, therefore, in a heated condition.

In the drawing accompanying and forming a part of this specification:

Figure 1 is a view showing a gasket for an eight-cylinder engine made in accordance with my invention.

Figure 2 is a view showing a section upon a vertical transverse plane along the axis of one of the cylinders of the engine with which the gasket is used, illustrating how the gasket is placed between the head and block when in use.

Figure 3 is a view showing a section upon a larger scale along the line 3—3, Figure 1.

Figure 4 is a similar sectional view along the line 4—4, Figure 1 not enlarged so much, however, as Figure 3.

Figure 5 is a fragmentary view illustrating a feature of my invention.

Figures 6 to 8 are fragmentary views illustrating modified forms of my invention hereinafter particularly referred to and explained.

Referring now to the drawing, the numeral 6 designates a layer or sheet of asbestos or equivalent yieldable material extending throughout the area of the gasket, and 7 and 8 are two sheets of thin metal, preferably copper, placed one upon each surface of the intermediate yieldable layer; and the gasket thus formed is provided with holes 9 above the cylinders (as shown in Figure 2 wherein the gasket as a whole is indicated by the numeral 10), with holes 11 which permit the flow of water from the cooling jacket space 12 of the cylinder block to the jacket space 13 within the cylinder head, with holes 14 through which the bolts (one of which is shown at 15, Figure 2) which secure the head 16 to the cylinder block 17 extend and, in case the engine is of the type wherein the valves are in the head, with openings 18 through which the valve operating push rods 19 pass. Obviously the size, number and particular arrangement of these passages through the gasket will depend upon structural and other features of the engine with which the gasket is to be used. One of metal sheets (the sheet 7 of the gasket illustrated) is provided with annular flanges 20 which extend through the asbestos layer and the other sheet and the free ends of which flanges are turned outward and overlay the second mentioned sheet as shown at 21, whereby the three layers of the gasket are held together; and whereby the edges of the asbestos layer at the holes 9 above the cylinders, and at the water passages 11, are provided with metallic linings. This is a common feature in gaskets which serves to strengthen them at the openings and to more certainly prevent outflow of hot gases from the cylinders and the flow of cooling water from the water passages into cylinders. The same scheme for strengthening the gasket around the periphery of large openings is used about the rod openings 18, and the holes 14 for the holding bolts may be similarly lined if deemed necessary. When the gasket is compressed and in use the outwardly extending upper ends 21 of the flanges 20 obviously lie in the same plane as the upper surface of the upper metallic sheet 8 as indicated in the fragmentary view, Figure 5.

One side edge or margin of one of the metal facings or layers is thickened along its length, as illustrated in Figures 1 and 4, this being shown as accomplished by folding the metal layer 7 over along one side, as at 22, and causing the folded over part to overlay and contact with the main body part of the layer. This folded over part is obviously integral with the main body part of the layer and forms a sort of a hem extending along one edge thereof and of the gasket. The width of this hem may vary; that is its edge may be in line with various of the bolt and water circulation holes, as shown, or it may be wider or narrower than as shown, depending upon particular features of structure and arrangement of the engine with which the gasket is to be used. The inner edge of the hem is shown as having U-shaped recesses in Figure 1 at the water passages 11 so as not to introduce an additional thickness of metal at these points, although this is a matter of secondary importance and the inner edge of the hem may substantially engage the flanges 20 of the passages 11 and lie beneath the outturned parts 21 thereof, as shown in Figure 6.

Instead of thickening the side edge of the metal layer by folding said side edge over and onto the body part of the layer the thickening may be secured by using a separate shim member, as shown at 23, Figure 7, extending along the edge to be thickened, and which member may be held in place in any way as by providing it with holes through which the flanges 20 of various of the water passages 11 extend. This shim member will obviously be of the thickness found necessary to accomplish the purpose of my invention; and more thickening of the side edge than is secured in Figures 1 and 4 may be secured by placing a narrow strip of metal between the body of the layer and the folded over hem part 22 thereof, as shown at 24, Figure 8.

Referring now to Figure 2 in explaining the advantageous results secured by the use of my improved gasket, the cylinder block of engines having a plurality of cylinders arranged in line ordinarily has a large longitudinally extending opening 25 (this being incident to the support of the core structure whereby the cooling jacket space 12 is provided during the casting of the block) and which opening leaves the outer margin of the upper surface of the cylinder block (along the part indicated by the numeral 26) unsupported except by the walls 27 of the cylinders; with the result that such bending, twisting or other strains as the part 26 may be subjected to during the tightening of the bolts which fasten the head to the block are communicated directly to and act to distort the cylinder walls. The head on the contrary is a more rigid structure because it is strengthened by the internal walls which provide the intake and exhaust passages, by the valve guide web the bosses or sleeves for the holding bolts and by other features of internal construction; from which it follows that distortion due to the tightening of the holding bolts occurs mostly if not entirely along the part 26 of the block, rather than in the head, from which part 26 it is communicated to the cylinder walls.

If the metallic surfaces of the block and head were in direct contact (both being plane surfaces) there would be no appreciable distortion as the holding bolts are tightened. The intervening gasket, however, is a yieldable member because of its asbestos layer; and the fact that the periphery thereof is more free to expand than parts inward and toward its center, the presence of double thicknesses of metal provided by the overlaying flanges 21 surrounding the cylinder bores 9 and water passages 11, and the impossibility of making the tension upon each holding bolt equal throughout the area of the head, are circumstances which result in objectionable distortion incident to the use of present gaskets and due, in the final analysis, to variations in thickness of the gasket when the holding bolts are tightened.

During such tightening the more flexible cylinder block has obviously to adapt itself to the comparatively rigid head and to variations in thickness of the gasket, thus producing distortion of the cylinder walls as explained.

The above as a matter of course applies to gaskets as heretofore made wherein the side thereof has not been thickened as by the hem 22 or shim member 23 or its equivalent, and wherein variations in thickness of the gasket as the bolts are tightened results in distortion along the part 26 of the block and in the cylinder walls. When, however, as in my invention, the gasket is made thicker along the side thereof adjacent the part 26 of the block tightening of the holding bolts does not reduce the thickness of the gasket in that region as much as when the thickened feature is not used, and a more uniform reduction in thickness of the gasket throughout its entire area is secured than has heretofore been the case; thus avoiding the setting up of bending, twisting or other strains in the part 26 of the cylinder block and consequent distortion of the cylinder walls.

The proper thickness and width for the hem or shim varies somewhat in gaskets for different engines, being dependent upon the structure and arrangement of the engine parts. The particular gasket illustrated and hereinbefore described is one which was designed for, and which has been used with many straight eight engines used in Buick automobiles, and has proven successful for the purpose hereinbefore explained for which it was designed in that distortion of the cylinder walls has been obviated.

Having thus described and explained my invention I claim and desire to secure by Letters Patent:

1. A gasket comprising a layer of compressible gasket material having a metal layer thereon, said metal layer being folded upon itself to form an integral hem lying snugly on one side thereof and extending along one edge of the gasket.

2. A gasket comprising a layer of compressible gasket material, a bottom metal layer and a top metal layer, one of said metal layers having an integral hem bent inwardly to lie snugly against the inner side thereof and against the compressible layer and extending along one edge of the gasket.

FREDERICK ROY STEPHENS.